Figure 1:
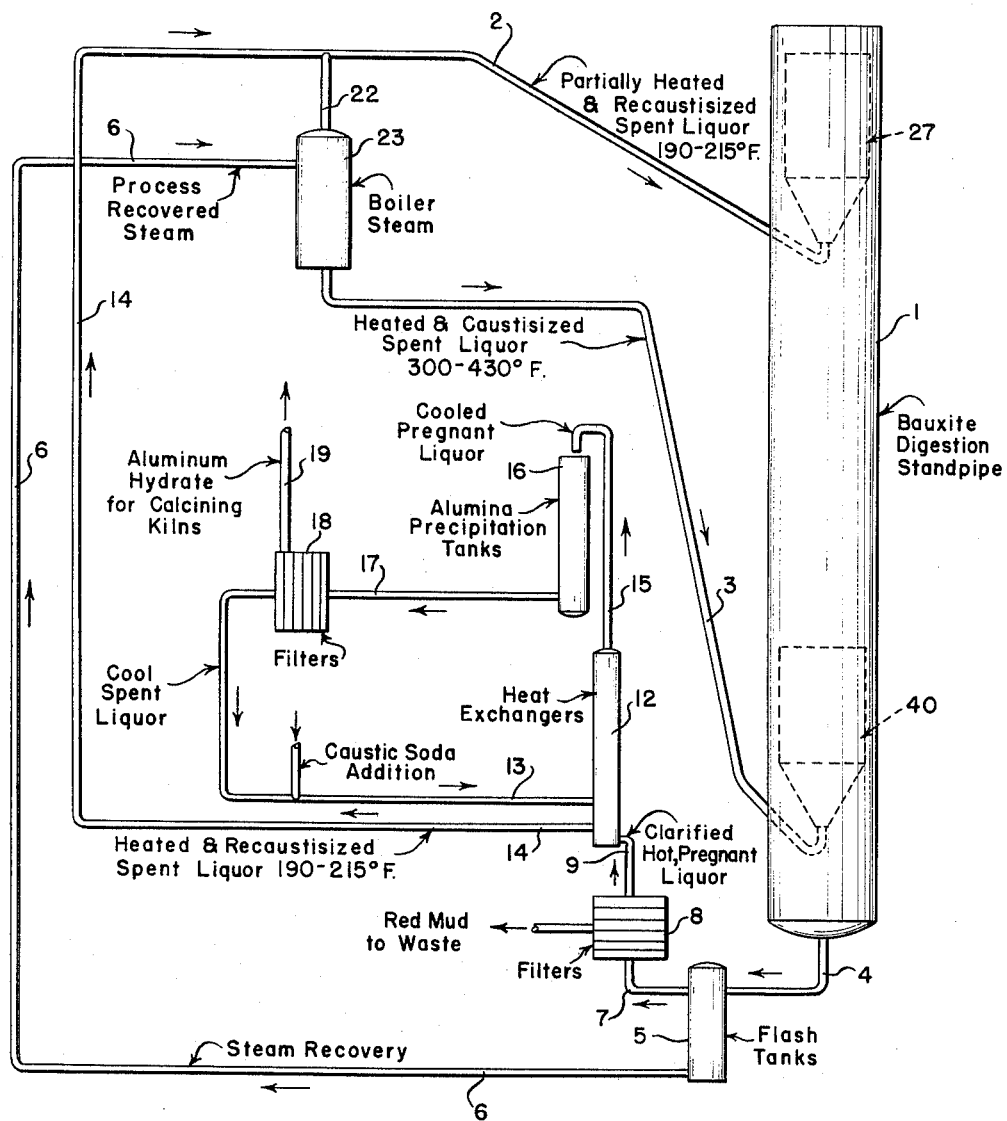

INVENTOR
Arthur F. Johnson

March 22, 1966     A. F. JOHNSON     3,241,910
PROCESS FOR SEPARATING AL-VALUES FROM ORES
Filed Sept. 29, 1960     2 Sheets-Sheet 2
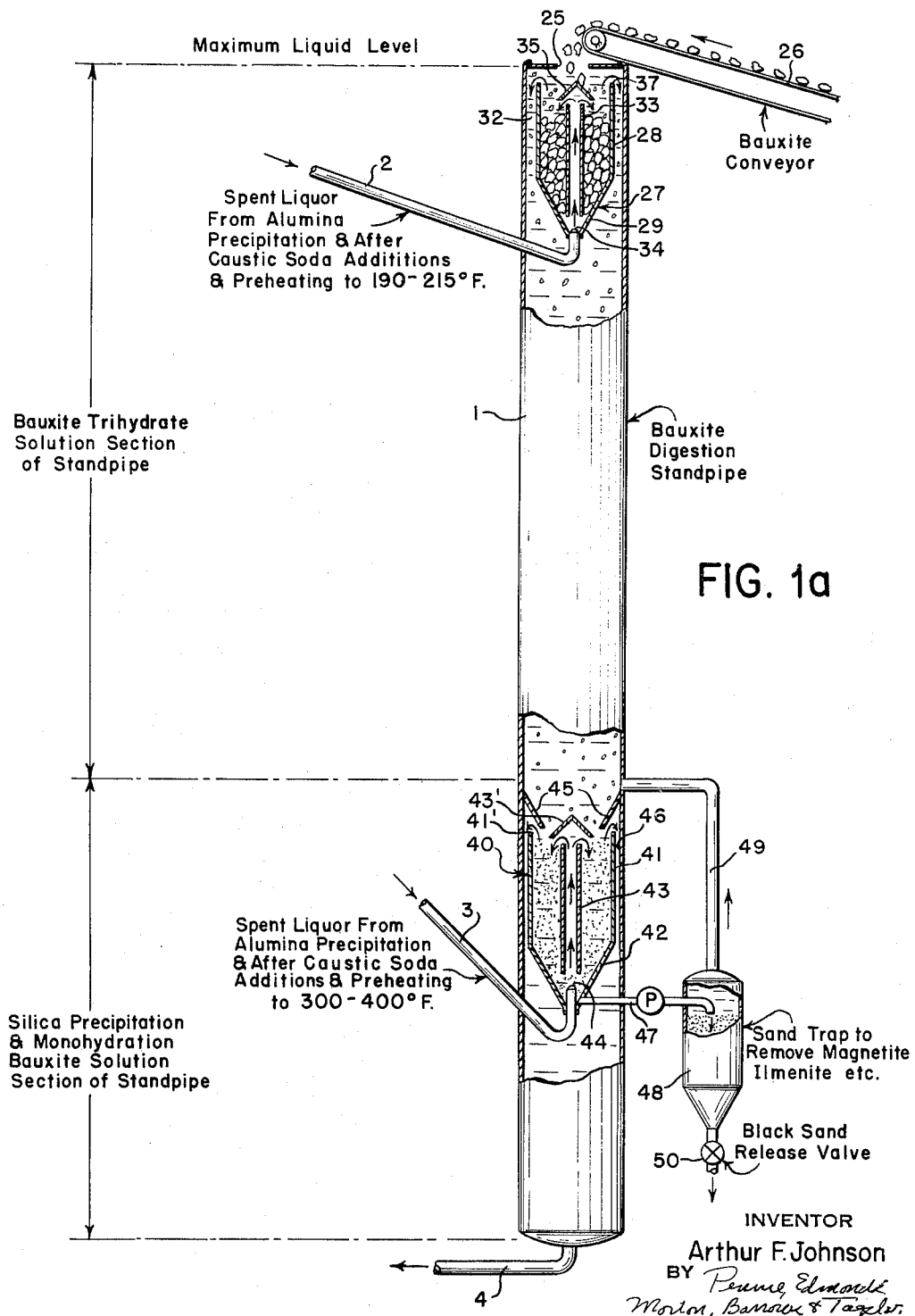

United States Patent Office

3,241,910
Patented Mar. 22, 1966

3,241,910
PROCESS FOR SEPARATING Al-VALUES
FROM ORES
Arthur F. Johnson, 1438 Balsam Ave., Boulder, Colo.
Filed Sept. 29, 1960, Ser. No. 59,310
3 Claims. (Cl. 23—52)

This invention relates to chemical processing and apparatus therefor, and provides an improved process and apparatus for the digestion of such materials as bauxitic or lateritic ores (hereinafter, for convenience, called ("bauxite") for the extraction of alumina.

For many years the process used for alumina extraction from bauxite ores has been the Bayer process as early represented by Patent No. 515,895 and more recently represented in improved form, for example, the Turner et al. Patent No. 2,107,919. The process of bauxite digestion includes two distinct steps: (1) the solution of the alumina in caustic liquor, and (2) the precipitation of the silica of the ore as a complex sodium-silica-alumina compound. In the case of bauxite ore containing the alumina as a trihydrate of alumina, the alumina goes into solution at or below 200° F.; but in the case of bauxite containing the alumina as the monohydrate temperatures from 340° to 400° F. as well as stronger caustic solutions may be necessary for solution than are required for bauxite containing the trihydrate.

In any case, the desilication of the caustic solution (after the alumina is dissolved therein) requires a temperature of about 290° F. or more for 30 to 50 minutes. In the operation the temperature precipitates the complex sodium-silica-alumina compound which can be filtered off with the other undissolved impurities such as oxides of iron, titanium, manganese, etc. which constitute what is known in the art as red mud. This leaves the alumina present in a clear solution from which, by cooling, pure alumina can be precipitated.

A plant for the extraction of alumina from its ores by present practices is extremely complicated and expensive to build. It consists of machinery and equipment for: bauxite crushing and grinding, bauxite digestion with caustic liquor, flash cooling, pressure filtration of red mud from liquor, heat exchanging, alumina precipitation, filtration of precipitated alumina and, lastly, calcination of alumina. Besides the foregoing process steps there are many minor and interrelated steps. The large investment in equipment and machinery is necessary to minimize the treatment cost of alumina. The object of this invention is to simplify and cheapen the process of extraction of alumina from its ores by eliminating the ore crushing and grinding and improving the digestion with a material saving in operating costs.

In accordance with my invention, I feed uncrushed and unground bauxite ore into the top of a tall upright standpipe or tower containing caustic solution in which the bauxite is agitated and settles. Hot caustic solution (caustic replenished liquor) is introduced at a level considerably below the top, and hotter caustic solution is introduced at a lower level. Both solutions would boil if it were not for the restricting pressure of the hydrostatic head of the solution in the tower at the level of introduction. The temperature is progressively lower in the direction of the top and is cooled by the added cold bauxite which settles in the tower. As the bauxite settles into hotter and hotter caustic the alumina dissolves, first the trihydrate near the top, and then the monohydrate, and the silica is precipitated as complex sodium-silica-alumina compound.

The tower is provided with at least two classifier units, one located below the top and one located at a lower level and the caustic solutions are introduced into these units. The bauxite in lump form is fed into the top of the tower and is directed into the upper unit and the hot caustic solution is introduced into the upper classifier and the hotter caustic solution is introduced into the lower classifier under such pressure that the bauxite is agitated and at a temperature not high enough to cause boiling of the resulting bauxite-liquor slurry at the pressure where the caustic is injected. However, some boiling may be permitted in the central ducts within the classifiers to facilitate agitation. The tower is filled with caustic solution and bauxite ore of varying sizes which prevent or suppress upward flow of the solution.

In the upper classifier unit the lumps of ore are agitated and dissolved until they become sufficiently small to be carried upward and out of the unit and permitted to settle in the tower until they reach the lower classifier wherein they are again agitated with caustic liquor at a higher temperature and pressure until the remaining alumina is dissolved and the silica is precipitated as a complex sodium-silica-alumina compound mixed with iron oxide from which it derives the name "red mud." The process accordingly comprises the progressive stage-by-stage agitation of bauxite lumps at progressively increasing temperatures and pressures until the alumina is dissolved. It is advantageous to maintain a lower density mixture of bauxite and caustic liquor in the lower part of the tower than in the upper part by bleeding out magnetite, ilmenite and other heavy minerals from the lower part and by adding more caustic liquor into the lower part, or both.

The apparatus of the invention comprises a tall upright tower, say 100 feet high and from 3 to 8 feet in diameter having an open top and a closed bottom having a controlled outlet. Two or more classifier stages are arranged in the tower, one several feet below the top and one at a much lower level but above the bottom. Each classifier unit comprises a vessel, preferably cylindrical with a conical bottom, concentric with the tower and providing an annular space between the cylindrical part and the tower. Each classifier comprises a central narrow pipe or duct inside the vessel open at the top and located directly over a port or ejecting nozzle at the bottom of the vessel through which hot caustic liquor is forced.

The fresh bauxite is dropped into the upper vessel and is pushed upward in the duct by the jet of solution which agitates the lumps, keeping them in suspended agitation until they dissolve to a size which permits the liquor to carry them upward and out of the upper classifier from which they fall through the annular space and progressively hotter caustic liquor and are directed into the upper open end of the duct of the lower classifier. The hotter caustic liquor is ejected through the nozzle of this lower classifier to repeat the agitation in the duct and ultimate solution of the alumina, precipitation of the silica complex and the formation of red mud. The upright tower has a restricted opening at the bottom for removing the alumina-containing solution, means for removing solid residues from the lower classifier, one near the top of the tower and one at a much lower level.

The vessels of the classifiers are connected to pipes for introducing hot caustic liquor advantageously caustic-enriched liquor and discharging it as a jet into the upright ducts for agitating the ore by circulating it up through the ducts and down through the vessel until the particles have dissolved. The pipes for supplying hot caustic liquor are preferably connected to a typical Bayer type system to receive caustic-enriched spent liquor from the precipitation of alumina.

These and other novel features of the invention will be better understood after considering the following discussion with reference to the accompanying drawings in which FIG. 1 is a diagrammatic illustration of an arrangement of apparatus for the recovery of alumina in combination with apparatus of the invention, and FIG. 1a is a vertical side view of apparatus of the invention with parts shown in section.

The apparatus illustrated in FIG. 1 comprises a tower 1 of the invention which is connected at a level spaced below the top to a pipe 2 for receiving hot spent caustic liquor and another pipe 3 at the lower portion of the tower for receiving other hot spent caustic liquor, and a pipe 4 at the bottom for the removal of alumina-containing solution and suspended inert material. All of the apparatus illustrated to the left, as seen in FIG. 1, is used in a typical Bayer type operation for the production and recovery of alumina. This apparatus includes a flash tank 5 for receiving the solution and suspended matter from pipe 4, an outlet pipe 6 for the flashed-off steam and an outlet pipe 7 which leads to a filter 8 from which the inert material, usually called red mud, is separated from a clarified hot pregnated liquor containing the alumina in solution.

This solution is removed from the filter through pipe 9 and is passed through the heat exchanger 12 in heat exchange contact with spent liquor circulating through the pipes 13 and 14. The cooled alumina solution passes through pipe 15, the precipitation tank 16 and pipe 17 to the filters 18. The resulting aluminum hydrate is passed through pipe 19 to calcining kilns (not shown). The heated and recausticized spent liquor flowing through pipe 14 is at a preferred temperature of from 190–215° F. and is passed into pipe 2. Some of the solution is bypassed through pipe 22 and passed into the steam boiler 23 which receives steam from pipe 6. The recausticized spent liquor passing through the steam boiler is heated to a preferred temperature of from 300–430° F. and is passed through pipe 3 into the lower portion of tower 1.

The apparatus of the invention is more completely illustrated in FIG. 1a. The tower 1 is preferably about 100 feet in height and varies from 3–8 feet in diameter. The top of the tower has a restricted opening 25 through which the unground and lumpy bauxite ore is passed from the belt conveyer 26. The tower is maintained filled almost to the top with a mixture of the caustic liquor and particles of bauxite ore of varying sizes. Near the top of the tower a classifier 27 is mounted within the tower and comprises an upright conical vessel 28 having a conical bottom 29 the apex of which is connected to the pipe 2 the outlet of which serves as a nozzle. The vessel 28 is preferably cylindrical and is located concentrically within the tower so as to provide an annular passageway 32. Centrally located within the vessel is a classifier duct 33 which is spaced directly above the nozzle opening 34. The conical baffle 35 is disposed above the top of duct 33 to prevent the ore from falling directly therein from the conveyer.

Similar classifiers may be located at intermediate places between the upper classifier 27 and the classifier 40 which is located in the lower portion of the tower but appreciably above the bottom. This lower classifier also has a vessel consisting of a cylindrical part 41, a conical part 42 the apex of which is connected to pipe 3, a centrally located classifier duct 43 is located directly above the nozzle 44 of the pipe 3. In order to guide the particles of ore descending in the tower into the lower classifier a conical baffle 45 is attached to the inner tower wall. This baffle prevents the ore from entering the annular space 46 between the vessel 40 and the tower 1.

A lateral pipe 47 passes through the tower and is attached to the lower portion of the vessel 40. Accumulated sandy material, such as magnetite and ilmenite, is pumped out of the classifier through pipe 47 with the pump P and discharged into the sand trap 48. The separated liquor is returned to the tower through the pipe 49 and the sandy material is discharged through the valved duct 50. The classifiers 27 and 40 may be made as long as 3 to 6 times the diameter of the tower. The central pipes inside the classifiers designated as 33 and 43 may be 6" to 18" in diameter and extend from about a foot from the bottom of the cone of the classifier to the top or even a few inches above the top of the level of the classifier overflow.

In the apparatus illustrated the classifiers perform the essential digestion functions of (1) dissolving the lumps of bauxite and (2) precipitating the silica as a complex sodium-alumina-silicate. Likewise, the classifiers control the specific gravity within the classifiers themselves and within the tower between the classifiers. The specific gravity within the classifiers is controlled to suit the degree of digestion of lumps desired in the upper classifier and of precipitated mud in the lower classifier where all lumps are dissolved and only red mud (hydrates of $Fe_2O_3$ and sodium-alumina-silicate) and some black sand (ilmenite and magnetite grains) overflow the classifier with the liquor.

The specific gravity in the upper classified 27 is determined by the amount of liquor added there through pipe 2. This liquor has a specific gravity of about 1.2 because it may contain, in the American Bayer process, about 45 grams per liter of $Al_2O_3$ and 240 grams per liter of total soda as $Na_2CO_3$ of which about 160 grams per liter is causticized so that it will dissolve the bauxite. After total digestion the liquor at exit pipe 4 may contain 95 grams per liter of alumina in solution as sodium aluminate; but in classifier 40 the liquor is intermediate between 45 and 95 grams per liter in alumina content when trihydrate bauxite is being digested.

Stated in other words, the total liquor added to the tower, in the American Bayer type of digestion used with trihydrate bauxite, is about 20 times or more the weight of the bauxite that can be digested, and of this amount the proportion of liquor added to classifier 27 through pipe 2 is just enough so that the large lumps of bauxite added by the conveyer 26 do not build up over the top of the level of the tower. Of course, the amount of bauxite delivered is always regulated, in the American Bayer process, to build up the liquor in the total digestion process to the above stated approximate 95 grams per liter. The proportion of liquor added to classifier 27 through pipe 2 may be as low as will keep the solids in the slurry in classifier 27 occasionally as high as 60% but usually lower, around 40%. The less the proportion of liquor added through pipe 2 the less high the temperature will have to be in the balance of the liquor added to classifier 40 through pipe 3 in order to achieve the necessary temperature of 290° F. for sodium-alumina-silicate precipitation (in the case of trihydrate bauxite) or 300 to 430° F. boehmite digestion temperature in the case when monohydrate bauxite is used.

The principal function of the upper classifier 27 is to produce a slurry of 30% to 60% solids in the tower 1 above the lower classifier 40 where most digestion and precipitation of the sodium-alumina-silicate takes place. Thus the upper classifier 27 and tower 1 act as a high gravity plug to prevent boiling by containing the pressures existing at the bottom of the tower with the temperatures employed there. The density of the slurry in the tower above the lower classifier 40 may run from 1.7 to 2.2 due to containing 40–60% bauxite of specific gravity from 2.3 to 3.1. In the lower classifier 40 the percent solids may drop as low as 15% to 20% due to the additional liquor added and the solution therein of the alumina content of the bauxite.

The injected liquor from pipes 2 and 3 through nozzles 34 and 44 induces such a high upward velocity in the pipes 33 and 43 respectively that these pipes do not plug with lumps of bauxite. The vessel 28 of classifier 27 receives the lumps of bauxite from the conveyer 26. As these lumps settle to the bottom of the classifier cone 29 through the thick slurry (30–60% solids) they meet the jet of hot liquor from nozzle 34. This injection forces the lumps into the central duct 33 through which they rise rapidly due to the high velocity of the jet and the lower specific gravity of the mixture within the duct which may run from 1.0 to 1.6 (compared to the slurry in the classifier 27 which may run 1.7 to 2.1) especially since some steam may be released in the jet to lower the specific gravity of the gas-liquid-solid mixture within the central duct 33. This recirculation of the bauxite lumps causes their rapid disintegration into smaller lumps and red mud consisting of iron oxide (mostly $Fe_2O_3$). When the lumps are reduced below several inches in diameter, the high density in classifier 27 and the overflow velocity carries them over the top edge 37 of the classifier and into the annular space 32 where they again settle and are guided by the baffle 45 into the vessel 41 of the lower classifier 40.

The action of recirculation in the lower classifier is much the same as in the upper one excepting the lumps of bauxite circulating are much smaller because the great volume of superheated liquor dissolves them. The specific gravity is usually from 1.8 to 2.2 and the percent solids only from 15–30% consisting of the red mud remaining after the bauxite is dissolved and the silica is precipitated as sodium-alumina-silicate. The $Fe_2O_3$ as slime in the red mud has a specific gravity of about 5.1 and the ilmenite as grains of 4.7 so even with only from 15–30% solids the specific gravity in classifier 40 can be maintained above that in the tower above it. To prevent the coarse grains of ilmenite from collecting in classifier 40 to excessive degree a small part of the flow is bled off through pipe 47 by means of the pump P introducing this into a sand trap classifier 48 from which the black sand consisting mostly of ilmenite and magnetite is removed through the release valve 50 while the body of the liquor returns via pipe 49 to the tower.

No bauxite particles overflow classifier 40 until thoroughly cleaned of their alumina content. The specific gravity of the slurry in the tower below classifier 40 is independent of the classifying actions in the tower or classifiers above it and depends entirely on: (a) the amount of insolubles (red mud) present in the ore and formed as complex sodium-alumina-silicate, (b) the proportion of liquor to ore and (c) the specific gravity of the liquor (exclusive of red mud) after digestion. In many cases the specific gravity of the slurry in the tower below classifier 40 may be lower than the specific gravity of the slurry in the tower above classifier 40.

Hence, there would be a tendency for the slurry below classifier 40 to rise and be quickly displaced by the heavier undigested slurry above classifier 40; but this is prevented by the baffle plate 45 which projects down to or slightly below the top edge or lip 41' of classifier vessel 41. It will be noted that baffle 45 thus performs a dual function since, as stated above, it also guides the lumps of bauxite settling in the tower into classifier 40. The conical baffle 43' which is disposed above the top of duct 43 prevents the low specific gravity slurry within the duct from rising into the tower and guides it towards the classifier overflow lip 41'.

I claim:

1. The process of separating alumina from bauxite ore which comprises introducing the ore in lump form into hot caustic liquor in an upright tower, introducing a jet of hot caustic liquor at a temperature near its boiling point at the existing pressure into a classifier near the upper part of the tower which jet agitates the lumps and reduces their size by dissolving the alumina, thus causing removal from the classifier of relatively smaller size lumps into the caustic liquor in the tower, settling the ore lumps of reduced size in caustic liquor of progressively increasing temperature towards the lower part of the tower, said ore lumps of reduced size entering a lower classifier near the lower part of the tower, and introducing another jet of caustic liquor at a temperature of from 300° to 400° F. into the lower part of the lower classifier to effect further agitation of the lumps and solution of the alumina, the caustic liquor in the tower being near its boiling point at the existing pressure and being prevented from boiling by the static head of liquor in the tower, removing from the lower classifier and tower undissolved portions of the ore and separating from the lower part of the tower a solution of alumina in the caustic liquor.

2. In the process of claim 1 injecting caustic liquor into the upper classifier at a temperature of from 190° to 215° F.

3. The process of separating alumina from bauxite ore which comprises feeding the ore in lump form into the upper part of a single column of hot caustic liquor in an upright tower having interior classifiers one near the top and one near the bottom, said caustic liquor being near its boiling point and progressively increasing in temperature from the upper part of the column to the lower part of the column, said temperature varying directly according to the hydrostatic pressure of said column of liquor, agitating said ore in the classifier near the upper portion of the column with a jet of hot caustic liquor at a temperature below its boiling point to reduce the size of the lumps by attrition and by dissolving the alumina, settling the reduced lumps in said column of liquor to a lower portion of the column and again agitating the reduced lumps with another jet of hot caustic liquor having higher temperature than the temperature of the first-mentioned jet to dissolve the remaining alumina leaving undissolved residue, allowing to overflow from the lower classifier in the column a solution of alumina in the caustic liquor with suspended red mud residue, and settling from the lower classifier of the column the undissolved residue.

References Cited by the Examiner
UNITED STATES PATENTS

| | | | |
|---|---|---|---|
| 1,825,752 | 10/1931 | Mott | 75—101 X |
| 1,953,144 | 4/1934 | Wilson | 23—141 X |
| 2,056,933 | 10/1936 | Weigel | 23—143 |
| 2,653,084 | 9/1953 | Greenbank | 23—290.5 |
| 2,776,877 | 1/1957 | Cardon | 23—290.5 |
| 2,785,956 | 3/1957 | Dunn | 23—143 |
| 2,852,343 | 9/1958 | Seandrett et al. | 23—143 |
| 2,921,842 | 1/1960 | List | 23—270 |
| 3,080,220 | 3/1963 | Lagatski | 23—270 X |

MAURICE A. BRINDISI, *Primary Examiner.*

GEORGE D. MITCHELL, *Examiner.*